United States Patent
Darolia et al.

(10) Patent No.: US 6,436,473 B2
(45) Date of Patent: Aug. 20, 2002

(54) GRADED REACTIVE ELEMENT CONTAINING ALUMINIDE COATINGS FOR IMPROVED HIGH TEMPERATURE PERFORMANCE AND METHOD FOR PRODUCING

(75) Inventors: Ramgopal Darolia, West Chester; Joseph D. Rigney, Milford; Joshua L. Miller, West Chester, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/929,594

(22) Filed: Aug. 14, 2001

Related U.S. Application Data

(62) Division of application No. 09/222,842, filed on Dec. 30, 1998, now Pat. No. 6,344,282.

(51) Int. Cl.$^7$ ................................................ C23C 16/08
(52) U.S. Cl. .................... 427/252; 427/253; 427/255.7; 427/379; 427/383.7; 148/240; 205/192
(58) Field of Search .................................. 427/252, 253, 427/255.7, 596, 379, 383.7; 140/240; 205/192, 264

(56) References Cited

U.S. PATENT DOCUMENTS

| | | | |
|---|---|---|---|
| 5,514,482 A | 5/1996 | Strangman | 428/623 |
| 5,658,614 A | 8/1997 | Basta et al. | 427/253 |
| 5,716,720 A | 2/1998 | Murphy | 428/623 |
| 5,788,823 A | 8/1998 | Warnes et al. | 205/192 |
| 5,807,613 A | 9/1998 | Aguero et al. | 427/528 |
| 5,866,271 A | 2/1999 | Stueber et al. | 428/545 |
| 5,985,467 A | 11/1999 | Beele | 428/623 |
| 5,989,733 A * | 11/1999 | Warnes et al. | 428/652 |

* cited by examiner

*Primary Examiner*—Timothy Meeks
(74) *Attorney, Agent, or Firm*—David L. Narciso; McNees, Wallace & Nurick

(57) ABSTRACT

A diffusion aluminide coating having a graded structure is applied over a nickel base superalloy substrate. The coating has an inner region of a diffusion aluminide adjacent to the substrate rich in a reactive element, typically Hf, Si or combinations of the two. The near surface region is a diffusion aluminide which is substantially free of reactive elements. Such coatings when used as bond coats in thermal barrier coating systems exhibit improved spallation performance.

7 Claims, 1 Drawing Sheet

GRADED REACTIVE ELEMENT CONTAINING ALUMINIDE COATINGS FOR IMPROVED HIGH TEMPERATURE PERFORMANCE AND METHOD FOR PRODUCING

This is a division of patent application Ser. No. 09/222,842, filed Dec. 30, 1998, now U.S. Pat. No. 6,344,282.

BACKGROUND OF THE INVENTION

1. Field of the Invention

This invention relates to gas turbine engines, and more particularly, to coatings applied to airfoils in the turbine portion of the gas turbine engine.

2. Discussion of Prior Art

The current coatings used on airfoils exposed to the hot gases of combustion in gas turbine engines for both environmental protection and as bond coats in thermal barrier coating (TBC) systems include both diffusion aluminides and MCrAlY(X) coatings. These coatings are applied over substrate materials, typically nickel-base superalloys, to provide protection against oxidation and corrosion attack. These coatings are formed on the substrate in a number of different ways. For example, a nickel aluminide (NiAl) layer may be grown as an outer coat on a nickel base superalloy by simply exposing the substrate to an aluminum rich environment at elevated temperatures. The aluminum diffuses into the substrate and combines with the nickel to form an outer surface of NiAl. A platinum modified nickel aluminide coating can be formed by first electroplating platinum to a predetermined thickness over the nickel-based substrate. Exposure of the platinum-plated substrate to an aluminum-rich environment at elevated temperatures causes the growth of an outer region of NiAl containing platinum in solid solution. In the presence of excess aluminum $PtAl_2$ phases may precipitate in the NiAl matrix as the aluminum diffuses into and reacts with the nickel and platinum. Of course, an overlay of MCrAlY where M is an element selected from the group consisting of Ni and Co and combinations thereof may be applied to the substrate as a bond coat or as an environmental coating by any known technique. When applied as bond coats in thermal barrier systems, an additional thermally resistant coating such as yttria-stabilized zirconia (YSZ) is applied over top of the coating. However, as the increased demands for engine performance elevate the engine operating temperatures and/or the engine life requirements, improvements in the performance of coatings when used as environmental coatings or as bond coatings are needed over and above the capabilities of these existing coatings. Because of these demands, a coating that can be used for environmental protection or as a bond coat capable of withstanding higher operating temperatures or operating for a longer period of time before requiring removal for repair, or both, is required.

BRIEF SUMMARY OF THE INVENTION

The present invention is directed to an improved coating for use on an airfoil in the turbine portion of a gas turbine engine. In its broadest embodiment, the coating is for application over a nickel base superalloy substrate requiring environmental protection and which is subjected to elevated temperatures. The coating is comprised of a diffusion aluminide coating selected from the group consisting of NiAl and PtAl. As used herein, unless otherwise specified, the term platinum aluminide or PtAl refers to a platinum-modified NiAl in which the NiAl includes platinum in solid solution and in which $PtAl_x$ phases may be present as precipitates in the matrix. This platinum aluminide may be subsequently modified as discussed herein. This coating is applied by two distinct diffusion aluminiding cycles resulting in two distinct regions. One region of the coating is a diffusion aluminide having at least one element selected from the group consisting of hafnium (Hf), zirconium (Zr), yttrium (Y) and silicon (Si), and combinations of these elements. The second region of the diffusion aluminide coating adjacent to the first region is substantially free of any of the elements selected from the group consisting of Hf, Zr, Y and Si, except as occurs as a result of natural diffusion processes during subsequent high temperature exposures. Airfoils having coatings with such oxygen-active elements as Hf, Si, Y, and Zr and combinations thereof exhibit longer life and are capable of withstanding higher temperatures. When used for environmental protection, these coatings are expected to exhibit less corrosion and oxidation at higher temperatures than either the prior art aluminides or MCrAlY coatings. When used as a bond coat underlying a thermal barrier coating, the bond coat of the present invention provides an advantage of improved damage resistance in terms of lower spallation values for comparable times as compared to a standard aluminide baseline. This improvement translates into longer life.

Another advantage of the present invention is that it may be applied to improve the performance of bond coatings or environmental coatings for either new airfoils or for airfoils requiring refurbishment after removal from service. Other features and advantages of the present invention will be apparent from the following more detailed description of the preferred embodiment, taken in conjunction with the accompanying drawings which illustrate, by way of example, the principles of the invention.

DETAILED DESCRIPTION OF THE PREFERRED EMBODIMENT

Figure 1:
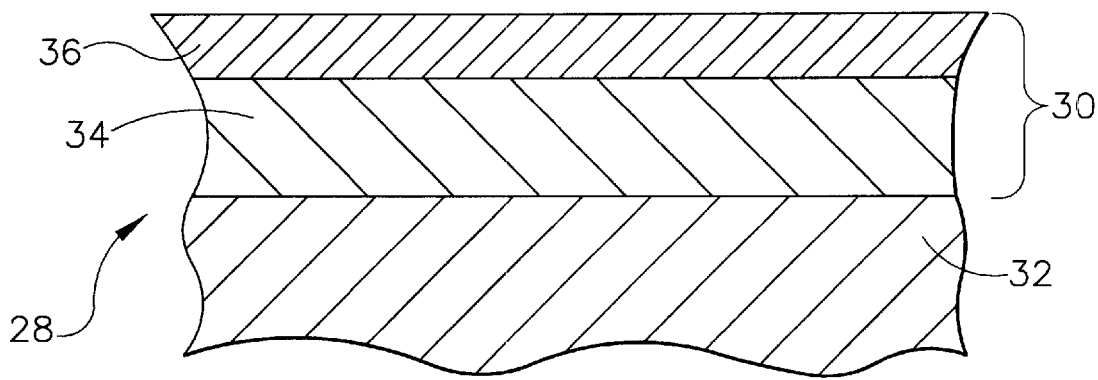
FIG. 1 is the tip end of an airfoil of the present invention having the coating of the present invention applied as an environmental coating.

FIG. 1 shows the tip 28 of an airfoil having an environmental coating 30 applied over a substrate 32. The substrate 32 may be any high strength nickel-based material capable of operation at elevated temperatures over long periods of time. However, it is preferred that substrate 32 be a nickel based superalloy substrate having a nominal composition in weight percent of about 7.0% chromium, 1.5% molybdenum, 5.5% tungsten, 6.2% aluminum, 7.5% cobalt, 0–0.15% hafnium, 3% rhenium, 6.5% tantalum, 20–300 ppm yttrium, 40 ppm boron, 0.05% carbon and the balance nickel and incidental impurities. Overlying substrate 32 in the embodiment shown in FIG. 1 is an aluminide coating 30 applied for the purposes of environmental protection. The aluminide coating has two distinct regions: a near surface region 36 and a region 34 immediately adjacent to substrate 32. Regions 34 and 36 comprise the aluminide coating 30. Coating region 34 immediately overlying the substrate 32 is a diffusion aluminide coating selected from the group consisting of platinum aluminide and nickel aluminide, and contains hafnium (Hf), zirconium (Zr), yttrium (Y), and silicon (Si) either individually or in combination. Near surface region 36 is substantially the same as the region of the coating 34 immediately adjacent to the substrate 32, except that the near surface region 36 is substantially free of Hf, Zr, Y, Si, and/or combinations thereof. The near surface region of the coating can be very thin, having a thickness of as little as 5 μm in the examples that follow. However, the thickness of the near surface region can be increased by lengthening the time the article is exposed to a coating method free of Hf, Zr, Y, Si, and/or combinations thereof. As used herein the term "substantially free" is used to compare the near surface region 36 to the portion of the coating 34 immediately adjacent to the substrate 32. As the portion of the coating adjacent to the substrate may contain Hf, Zr, Y, Si, and/or combinations thereof in concentrations greater than 2%, the near surface is considered to be substantially free of these elements when their concentration is well below the concentration in the coating adjacent to the substrate. While small amounts of these elements may be present in the near surface region 36 it is the result of natural diffusion processes that occur during subsequent high temperature exposures. However, the concentration of these elements in the near surface region 36 due to the effects of diffusion is small as compared to the amount in the region adjacent to the substrate. While this invention is described in terms of Hf, Zr, Y and Si, it will be understood that other strength increasing elements such as Ti, Re and Ta can also be added individually or in combination with any of the above elements. If any of these elements are added to the coating 30, they are added in such a way that their concentration in the region 34 immediately adjacent substrate 32 is significantly greater than their concentration in the coating in the near surface region 36.

Figure 2:
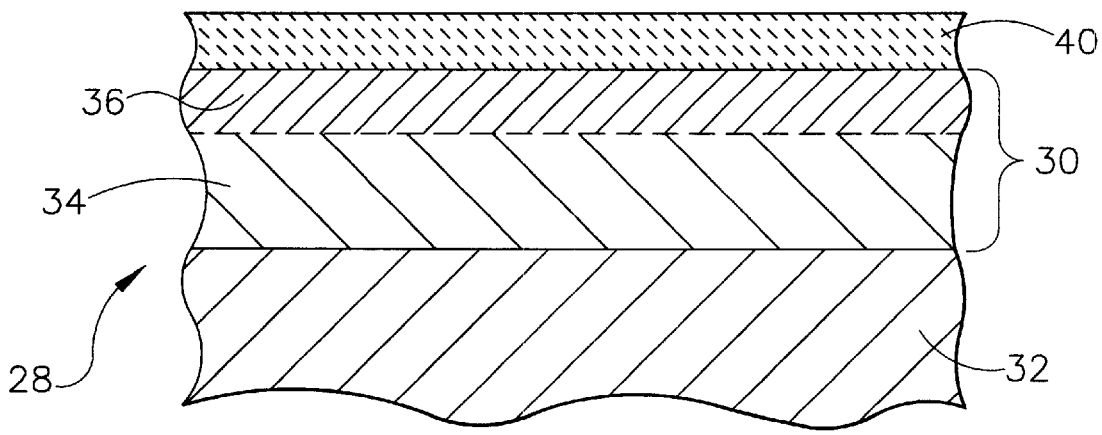
FIG. 2 is the tip end of an airfoil of the present invention applied as a bond coat with thermal barrier coating applied as a top coat.

FIG. 2 depicts the tip of a turbine blade 28 having a coating 30 with the structure of the present invention, the region nearer the substrate 34 being an aluminide coating including reactive elements, either singularly or in combination, such as described previously, and the near surface region 36 opposite the substrate being substantially free of reactive elements. The overall coating thickness may vary from about 10 to 100 μm, with each of regions 36 and 34 varying from 5–30 μm each. However, it is preferred that each of regions 36 and 34 vary from 15–25 μm each. The concentration of the reactive elements is greater in the region 34 of the coating adjacent the substrate than in near surface region 36 opposite the substrate. A thermal barrier coating 40 may be applied over top of the coating of the present invention as shown in FIG. 2. There are several methods for accomplishing the coating structure 30 of the present invention, shown in either FIG. 1 or FIG. 2. Each of these methods produces substantially the same product.

EXAMPLE 1

A substrate is electroplated with a thin region of platinum. After the article has been plated, it is placed in an atmosphere having a source of aluminum and reactive elements Hf, Y, Zr, and Si, either individually or in combination. Additional strengthening elements such as Ti, Ta, or Re may also be present in the atmosphere. The atmosphere containing a reactive element or elements and aluminum could be a vapor species of compounds of these elements such as halides as used in a chemical vapor deposition process (CVD). Alternatively, the platinum-plated article may be embedded in a mixture containing each of these elements as elemental powders or as various compounds plus an activator, such as is done in a pack cementation process. Alternatively, the articles can be exposed to vapors containing these elements such as occurs in above-the-pack (ATP) processes or in vapor phase aluminiding (VPA) processes. In this situation, the article is placed above the elements or compounds of the elements with an activator compound while the temperature is raised. As the various compounds begin to decompose into their constituent elements during heating, or as the elemental powders are heated, the atmosphere experiences increasing concentrations of the elements. Of course, the driving force for forming a nickel aluminide containing Pt in solid solution, is very strong. A diffusion region of nickel aluminide with solid solution Pt begins to form first and $PtAl_x$ phases may precipitate in the NiAl. The other elements, Hf, Si, Y and Zr, as their concentration increases, are then incorporated into the outer nickel platinum aluminide. The nickel aluminide formation reaction and reactive element incorporation process are both diffusion-controlled processes. Because the driving force for reacting with the aluminum-containing vapors is greater, the aluminide reaction proceeds more rapidly at first but after a period of time at elevated temperature, the concentration of reactive elements increases and these elements are incorporated into the diffusion aluminide layer. In addition, the platinum aluminide phase $PtAl_x$, precipitates, if formed, will also have the reactive elements incorporated into their structure. The exact composition of the platinum aluminide precipitate depends upon the concentration of the platinum, the time that the substrate is held at temperature, and the specific parameters of the heat treatment. Because of the lower driving force for the diffusion of reactive elements, the reactive elements initially diffuse into region 34 slower than the rate that the platinum aluminide coating is formed. In considering the diffusion rates of reactive elements, Hf diffusion occurs at a relatively slow rate, while Si diffuses more rapidly. Y and Zr diffusion occurs at rates intermediate between Hf and Si. Of course, the longer that the diffusion process is allowed to continue, the deeper the penetration of the reactive elements will be into the diffusion aluminide region 34, with the faster diffusing elements diffusing further than the hafnium.

Because the reactive elements tend to oxidize in environments such as the high temperature, corrosive environment of a turbine portion of a gas turbine engine, it is not desirable to expose region 34 to this atmosphere. Therefore, after the aluminide region 34 has been formed by the diffusion process and the reactive elements have been incorporated into it, region 36 is formed over region 34 by placing the coated substrate into an aluminum-rich atmosphere. This atmosphere can be created by any of the processing methods set forth above for forming the diffusion aluminide coating, except that the atmosphere is free of any concentrations of reactive elements. Thus, at an elevated temperature, region 36 is formed by a simple diffusion process. The driving force is the interdiffusion of Al, Ni and Pt to form an outer region which is substantially a platinum aluminide free of the slower diffusing reactive elements. Thus, the substrate is coated with a diffusion aluminide coating having an inner region including a platinum aluminide and reactive elements such as Hf, Zr, Y or Si, either alone or in combination, and an outer region of a platinum aluminide substantially free of reactive elements. If the substrate is a nickel-base superalloy, the diffusion aluminide will also contain a diffusion zone or region having the usual distribution of TCP phases, γ' and carbides as well as nickel aluminide. There will be a gradient of these phases from the substrate to the outer surface.

Typically, the inner region 34 includes at least one reactive element in a concentration of 0–10%. In a preferred embodiment, Hf is present in a concentration, in weight percent, of about 0.25–10%, while Si is optionally present in the amount of 0–5%.

While the platinum is deposited by an electroplating method in the above example, it is understood by those skilled in the art that the platinum may be deposited by any known method which deposits a thin region of Pt, including physical vapor deposition processes, such as sputtering and chemical vapor deposition.

Samples having the coating of the present invention applied as set forth in Example 1, were prepared by codepositing Al and Hf in a pack process for 4 hours followed by vapor phase aluminiding in an Al atmosphere free of Hf. Unless otherwise noted, co-deposition (CODEP), was performed at about 1975° F. Samples having a platinum aluminide coating and samples codeposited with Hf and Al over the substrate, but having no Pt, followed by vapor phase aluminiding in an Al atmosphere free of Hf were also prepared. The substrate for each sample was a ¼" pin sample of Rene' N5, a Ni-based superalloy. The samples were then tested to failure by cycling them in a burner rig. Each cycle comprises heating to about 1700° F. in 15 seconds, holding for about 10 minutes, heating to about 2075° F. in 15 seconds, holding for about 5 minutes, followed by a 75-second forced air cool. Testing was done in a mach 0.5 velocity flame using salt-contaminated fuel. Table 1 presents the failure results, in which the number of cycles required to attack the underlying substrate was recorded. Samples prepared in accordance with Example 1, sample numbers 1, 2, 3, and 4 exhibited longer life than the PtAl control samples (9, 10 and 11) and samples not including Pt in the aluminide region (samples 5, 6, 7 and 8).

TABLE 1

| Sample | Coating Type | Processing Sequence | Cycles to Failure |
| --- | --- | --- | --- |
| 1 | PtAl + Hf | Pt-plate, Codep (1975° F.), VPA | 1360 |
| 2 | PtAl + Hf | Pt-plate, Codep (1975° F.), VPA | 800 |
| 3 | PtAl + Hf | Pt-plate, Codep (1925° F.), VPA | 1120 |
| 4 | PtAl + Hf | Pt-plate, Codep (1925° F.), VPA | 1120 |
| 5 | NiAl + Hf | Codep, (1975° F.), VPA | 400 |
| 6 | NiAl + Hf | Codep, (1975° F.), VPA | 400 |
| 7 | NiAl + Hf | Codep, (1925° F.), VPA | 480 |
| 8 | NiAl + Hf | Codep,(1925° F.), VPA | 160 |
| 9 | PtAl baseline | Pt-plate, VPA | 300 |
| 10 | PtAl baseline | Pt-plate, VPA | 480 |
| 11 | PtAl baseline | Pt-plate, VPA | 560 |

It should be noted that the samples of the present invention without Pt noble metal incorporated (samples 5 through 8) exhibited equivalent performance to the PtAl baseline samples (samples 9 through 11). The incorporation of Hf using this invented process sequence counteracts the removal of Pt, an element usually found to be necessary for erosion resistance.

EXAMPLE 2

A nickel aluminide coating is formed on the surface of a nickel-based superalloy substrate by exposing the substrate to an atmosphere having a source of aluminum and reactive elements Hf, Y, Zr, and Si, either individually or in combination. Additional strengthening elements such as titanium or tantalum may also be present in the atmosphere. The atmosphere containing the reactive element or elements and aluminum can be a vapor species of compounds of these elements such as halides as used in a chemical vapor deposition. Alternatively, the substrate may be surrounded with a mixture of powders containing each of these elements in elemental form or as various compounds. Typically, this is accomplished by placing the substrate directly into the powders, such as is done in a pack cementation process. Alternatively, the substrate can be exposed to vapors containing these elements such as occurs in above-the-pack processes or in vapor aluminide processes. In this situation, the substrate is placed above the elements or compounds of these elements while the temperature is raised. As the various compounds begin to decompose into their constituent elements during heating or as the elemental powders are heated, the atmosphere experiences an increasing concentration of the elements. Of course, the driving force for forming the nickel aluminide is very strong, therefore a diffusion region of nickel aluminide begins to form on the surface. The other elements, as their concentration increases, are also incorporated into the thin but growing region of nickel aluminide. The nickel aluminide formation reaction and reactive element incorporation process are both diffusion-controlled processes. Because the driving force for reacting with the aluminum containing vapors exceeds that for the diffusion of the reactive elements, the reactive elements initially diffuse into nickel aluminide region 34, slower than the nickel aluminide region is forming. In considering the diffusion rates of reactive elements, Hf diffusion occurs at a relatively slow rate, while Si diffuses more rapidly. Y and Zr diffusion occurs at rates intermediate between Hf and Si. Of course, the longer that the diffusion process is allowed to continue, the deeper the penetration of the reactive elements will be into the diffusion aluminide region 34, with the faster diffusing elements diffusing to a greater depth than hafnium.

As in example 1 for the platinum aluminide diffusion region, it is undesirable for region 34 to be exposed to an oxidizing atmosphere such as occurs in a gas turbine engine because the reactive elements such as Hf, Zr, Y and Si tend to rapidly oxidize, and the oxides are not tightly adherent. When these elements are present in high concentrations, this oxidation is readily apparent because large areas of the surface become non-adherent (i.e. surface oxide spallation). After the reactive elements have been incorporated into region 34, region 36 is formed over region 34 by placing the coated substrate into an aluminum rich atmosphere that is free of any concentrations of reactive elements. Thus, at an elevated temperature, region 36 is formed by a diffusion process. The Al and Ni interdiffuse to form an outer region which is substantially a nickel aluminide free of the slower diffusing reactive elements. Thus the substrate is coated with a diffusion aluminide coating having an inner region including a nickel aluminide and reactive elements such as Hf, Zr, Y or Si either alone or in combination, and an outer region of a nickel aluminide substantially free of reactive elements. The diffusion aluminide region will contain the usual diffusion zone of TCP phases, and γ' and carbides and there will be a gradient of these phases from the substrate to the outer surface.

In each of these examples, region 34 of coating adjacent to substrate 32 is relatively rich in Hf, Si or any other reactive or strengthening elements that are added. The coated substrate is now placed in an atmosphere of aluminum. Because aluminum is a much faster diffusing element than any of the reactive elements that that are added in the previous step, the aluminum diffuses into the matrix and Pt or Ni diffuse outwardly toward the surface faster than the reactive elements. Thus, the outermost region of the coating is substantially richer in aluminum than in reactive elements such as Hf. The gradation of the coating will be such that near surface region 36 will have a high concentration of aluminum with little reactive elements such as Hf. With increasing distance inward from the outer surface towards the substrate, the reactive element concentration will increase to a peak level and then begin to decrease until the reactive element (Hf, Y, Zr, and/or Si) concentration approaches zero near substrate surface 32 or to a value that is substantially less than their peak level concentrations. While the inner region typically is formed by a pack cementation process in which there is a high concentration of a reactive element included, any process that permits formation of a diffusion aluminide rich in a reactive element may be used. Typically, ATP processes, chemical vapor deposition (CVD) processes or other vapor deposition methods may be used. Temperatures for forming the diffusion aluminide in the appropriate atmosphere range from about 1600° F. to about 2000° F. The time the article is held at the temperature will also vary, from about 2 to about 20 hours. The time, temperature and atmosphere are all interdependent, and will vary depending upon the desired results. All that is applicable to the formation of region 34 is equally applicable to the formation of region 36, although the atmosphere for region 36 will be devoid of reactive elements.

The coating of the present invention has been discussed in terms of its applications as to a new turbine engine component, such as a new blade. However, this invention is not so limited. For example, the coating can be applied to an existing component removed from service from a gas turbine engine. If the component has a thermal barrier coating, the thermal barrier coating may be removed by any suitable technique, and the bond coat can be inspected. If present as an environmental coating region, the coating can be inspected. If necessary, corrosion and oxidation products can be removed from the bond coat or the environmental coating as set forth above. While it is necessary to remove the corrosion and oxidation products from the component requiring refurbishment, it is neither necessary nor desirable to remove any existing coating because the coating of the present invention can be incorporated directly into or over the existing coating, whether the coating is an aluminide or an MCrAlY, where M is an element selected from the group consisting of Ni and Co and combinations of Ni and Co. The oxidation and corrosion products may be removed by techniques well known in the art such as chemical cleaning, caustic autoclave processing, or grit blasting. Of course, the aluminum content of the remaining aluminide coating is depleted of aluminum, as some of the aluminum is incorporated into the oxide by-products and diffused into the substrate.

EXAMPLE 3

A Ni-based superalloy turbine blade having a nominal composition, in weight percent of 7.0% Cr, 7.5% Co, 0.05% C, 1.5% Mo, 3.0% Re, 0.15 % Hf, 6.2% Al, 5.0% W, 6.5% Ta, 160 ppm Y, 40 ppm B and the balance Ni and having an environmental coating of platinum aluminide is removed from service. Oxidation by-products and corrosion are removed from the surface of the blade by grit-blasting. After cleaning, the airfoil is embedded in a powder mixture within a retort. The mixture contains a source of aluminum, a source of Hf, a halide activator and an inert filler. The airfoil to be coated is heated in the range of about 1850° F. to about 2050° F., preferably about 1950° F.(1070° C.) in an inert atmosphere. The activator vaporizes and reacts with the aluminum source, such as an aluminum intermetallic or other aluminum-containing compound to form an aluminum-rich halide vapor and a vapor of Hf. Aluminum reacts with the existing platinum aluminide coating to restore aluminum levels, while Hf also diffuses into the coating. The thickness and the composition of the coating depends on the time and temperature of the process, the activity of the powder and the composition of the workpiece being coated. After the coating has been regenerated by restoring aluminum, the airfoil is placed into a source of aluminum that is devoid of Hf, but including a halide activator and an inert filler. The airfoil to be coated is heated to a temperature in the range of about 1800–2050° F., preferably about 1950° F.±25° F. (1070° C.) in an inert atmosphere. The activator vaporizes and reacts with the aluminum source to form an aluminum-rich halide vapor. Aluminum diffuses into the coating, but relatively slowly, while Pt and Ni diffuses outward to form a platinum aluminide coating relatively free of Hf, since the Pt and Ni will diffuse at a faster rate than the Hf. Thus the structure of the present invention is formed.

An airfoil component may then have the graded coating of the present invention applied to it as set forth in examples 1 or 2. If a platinum aluminide coating is desired, then the methods set forth in example 1 are followed. If the component is a nickel-base superalloy and a nickel aluminide coating is desired, then the methods set forth in example 2 are followed. If the airfoil component is one which is undergoing repair, and it is not desirable to strip the aluminide coating from the airfoil, the repair procedure of example 3 is followed. It does not matter whether the prior existing coating is a nickel aluminide or a platinum aluminide.

Articles having the graded coating of the present invention used as a bond coat in a thermal barrier coating system are expected to exhibit superior spallation performance as compared to articles having the conventional PtAl bond coat and a ceramic topcoat of conventional 7% yttria-stabilized zirconia (7YSZ). In the following examples, button samples of a nickel-base superalloy substrate having the same nominal composition as the substrate of example 3, with overlying bond coats and 7YSZ topcoats were prepared and tested for spallation performance. The spallation performance was compared to the spallation performance of the same substrate having a standard PtAl coating as the baseline. The spallation performance of this baseline substrate with this standard bond coat and a 7YSZ topcoat, measured when 20% of the thermal barrier coating spalls from the surface, was 230 cycles at 2125° F. for a one hour furnace cycle test ( FCT), or alternatively stated, an FCT life of 230 cycles.

EXAMPLE 4

A button sample of the nickel-base superalloy substrate having the same nominal composition as the substrate of example 3 was prepared by embedding the substrate in a powder mixture of pure Hf, an $NH_4F$ activator, an aluminum powder source and alumina filler powders.

The Hf was present in the amount of 0.15–0.5% by weight, the halide activator in the amount of 0.1–0.2% by weight, the aluminum powder source in the amount of 1–5% by weight of codep-aluminide and the balance alumina filler. The powders were thoroughly mixed. The retort was heated to a temperature of about 1950° F. and held at temperature for about 4 hours to allow formation of a NiAl aluminide containing Hf. The sample was then removed from the pack and vapor phase aluminided, by flowing aluminum halide gas over the surface at a temperature of about 1950° F. for about 4–8 hours. This vapor phase process deposits aluminum on the surface of the article. However, the driving force for the diffusion process is such that nickel diffused outwardly to form an outer region of NiAl relatively free of the slower-diffusing hafnium so that the duplex coating of the present invention was formed. The button sample was then coated with a topcoat of 7YSZ and tested for spallation performance. The sample exhibited an FCT life of 400 cycles which was a significant improvement over the baseline sample. Microprobe measurements on an as-coated section removed from samples prior to testing disclosed the presence of, in weight percent, 34% Al and only 0.11% Hf in the first 5 μm of the bond coat. The Hf content increased to 0.51 in the region between 5–15 μm, with 32% Al, and to 6.9% Hf in the region between 15–30 μm, with an aluminum content of about 20.7%.

In this example, the aluminum codep powder consisting essentially of an aluminum intermetallic was used. However, any other suitable aluminum compound in powder form may be used.

EXAMPLE 5

Two button samples of the nickel-base superalloy substrate having the same nominal composition as the substrate of example 3 were prepared by first electroplating the sample with a thin region of Pt, about 3–6 μm thick. The Pt-coated specimens were then subjected to a conventional diffusion heat treatment. The coated samples were then embedded in a powder mixture of pure Hf, an $NH_4F$ activator, an aluminum powder source and alumina filler powders. The Hf was present in the amount of 0.15–0.5% by weight, the activator in the amount of 0.1–0.2% by weight, the aluminum powder source in the amount of 1–5% by weight of codep-aluminide and the balance alumina filler. The powders were thoroughly mixed. The retort was heated to a temperature of about 1950° F. and held at temperature for about 5 hours to allow formation of a platinum-modified nickel aluminide containing Hf. The samples were then removed from the pack and vapor phase aluminided by flowing aluminum halide gas over the surfaces at a temperature of about 1950° F. for about 4–8 hours. This vapor phase process deposited aluminum on the surface of the article. However, the driving force for the diffusion process is such that Pt and Ni diffused outwardly to form an outer region of platinum aluminide relatively free of the slower-diffusing hafnium so that graded coating of the present invention was formed. The button samples were then coated with a topcoat of 7YSZ and tested for spallation performance. The two samples exhibited FCT lives of 320 cycles and 380 cycles respectively, which represent significant improvements over the baseline sample. Microprobe measurements of the as-coated samples failed with the lives disclosed indicated that in the first 5 μm of the bond coat of the respective samples, Hf at 0.73% and 1.3%, while Al was at 28.5% and 29.2%, and Pt was at 27.5% and 24.4%, respectively. The Hf content increased to 2.5% and 11% in the region between 5–15 μm, with 28.7% and 25.1% Al, and 23.6% and 31.7% Pt, respectively. In the final 15–30 μm of the sample, Hf was measured at 1.4% and 2%, while Al was 29.0% and 27.7%, and Pt was 20.5% and 29.2%, respectively. All compositions are given in weight percent, unless otherwise noted.

EXAMPLE 6

Ni-based superalloy substrate samples having a nominal composition of 7.0% Cr, 7.5% Co, 0.05% C, 1.5% Mo, 3.0% Re, 0.15% Hf, 6.2% Al, 5.0% W, 6.5% Ta, 160 ppm Y, 40 ppm B and the balance Ni were first plated with a thin coating of Pt by a conventional electroplating process and then vapor phase aluminided to produce a single phase PtAl coating on the substrates. The samples were then inserted into a pack bed having a composition in weight percent of about 0.25% Hf, about 1% Codep powder as an aluminum source, about 0.25% Si and about 0.2% $NH_4F$ activator in an otherwise typical pack cementation process. After heating for about four (4) hours at about 1950° F., three samples were coated with a thermal barrier topcoat of 7YSZ and subjected to a FCT test at about 2075° F. Samples were also analyzed to determine the chemistry following the 4-hour temperature exposure at about 1950° F. Although treatment was performed at 1950° F. for about 4 hours, any suitable combination of time and temperature may be used to achieve the results set forth below. Typically, temperatures in the range of about 1850° F. to about 2000° F. for times of about 2–6 hours are used.

The overall thickness of the resulting coating was about 0.004". The tested chemistry (in weight percent) measured from the near (or outer surface) was as follows:

| Region Below Surface | Hf | Al | Si | Pt |
| --- | --- | --- | --- | --- |
| 0–5 μm | 0.08 | 21.34 | 4.45 | 26.8 |
| 5–15 μm | 0.31 | 20.99 | 4.80 | 24.9 |
| 15-30 μm | 0.36 | 21.44 | 4.15 | 25.02 |

The samples subjected to FCT failed at 900 cycles, 1060 cycles and 880 cycles. Spallation at failure for each sample was about 70% of the TBC, as compared to about 90% of the TBC for the baseline. Thus, samples prepared in accordance with this procedure had, on average about twice the cyclic spallation life as baseline samples.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A process for applying over a nickel-base superalloy substrate a diffusion aluminide coating selected from the group consisting of PtAl and NiAl and combinations thereof having two regions, a first region of aluminide including at least one element selected from the group consisting of Hf, Zr, Y, and Si and combinations thereof, and a second region adjacent to the first region substantially free of elements selected from the group consisting of Hf and Si, comprising the steps of:

placing the substrate into an elevated temperature atmosphere having a high concentration of aluminum and at least one element selected from the group consisting of Hf, Zr, Y and Si and combinations thereof for a sufficient period of time for formation adjacent to the substrate of a first region of aluminide coating including at least one element selected from the group consisting of Hf, Zr, Y and Si; and then removing the coated substrate from the elevated temperature atmosphere and placing the coated substrate into an elevated temperature atmosphere having a high concentration of aluminum and substantially free of elements selected from the group consisting of Hf, Zr, Y and Si for a sufficient time to allow for formation over the first region of a second region of aluminide coating substantially free of elements selected from the group consisting of Hf, Zr, Y and Si.

2. The process of claim 1 wherein the diffusion aluminide coating is applied by pack cementation by placing the nickel-base superalloy substrate into a mixture of powders including 0.15–0.50% by weight of an element selected from the group consisting of Hf, Zr, Y and Si, 1–5% by weight aluminum source, 0.1 –0.2% by weight halide activator and the balance inert filler at a temperature of 1850–2050° F. for 2–6 hours to form the first region of diffusion aluminide coating adjacent to the substrate having at least one element selected from the group consisting of Hf, Zr, Y and Si;

next removing the substrate from the elevated temperature atmosphere;

then realuminiding the diffusion aluminide-coated substrate by placing the substrate into the atmosphere having a high concentration of aluminum substantially free of elements selected from the group consisting of Hf, Zr, Y and Si at a temperature of from about 1850–2050° F. for a sufficient time to allow for formation over the first region of diffusion aluminide coating of a second region of aluminide coating substantially free of elements selected from the group consisting of Hf, Zr, Y and Si having a thickness of at least 5 $\mu$m.

3. The process of claim 2 wherein a thin region of platinum is first electrodeposited on the nickel base superalloy substrate before the step of placing the substrate in the mixture of powders.

4. The process of claim 3 wherein the platinum coated substrate is heat treated at temperature of 1600–2000° F. for 2–20 hours to allow platinum to diffuse into the substrate prior to the step of placing the substrate in the mixture of powders.

5. The process of claim 1 wherein the nickel-based superalloy substrate is comprised of a turbine airfoil removed from service further including removing oxide products and corrosion products from the surface of the airfoil substrate prior to the step of placing the airfoil into the elevated temperature atmosphere having a high concentration of Al and at least one element selected from the group consisting of Hf, Zr, Y and Si and combinations thereof.

6. A process for applying over a nickel-base superalloy substrate a diffusion aluminide coating selected from the group consisting of PtAl and NiAl and combinations thereof having two regions, a first region of aluminide substantially free of elements selected from the group consisting of Hf and Si and a second region of aluminide adjacent to the first region including at least one element selected from the group consisting of Hf, Zr, Y, and Si and combinations thereof, comprising the steps of:

placing the substrate into an elevated temperature atmosphere having a high concentration of aluminum and substantially free of Hf, Zr, Y and Si for a sufficient period of time for formation adjacent to the substrate of a first region of an aluminide coating;

then removing the coated substrate from the elevated temperature atmosphere and placing the coated substrate into an elevated temperature atmosphere having a high concentration of aluminum and at least one element selected from the group consisting of Hf, Zr, Y and Si and combinations thereof for a sufficient time to allow for formation over the first region of a second region of aluminide coating; and holding the coated substrate at an elevated temperature for a sufficient time so that the elements selected from the group consisting of Hf, Zr, Y and Si, diffuse from the second region into the first region.

7. The process of claim 6 further including the step of coating the nickel-base superalloy substrate with a thin region of Pt, and wherein the diffusion aluminide coating is formed by:

first forming a single phase PtAl-coated substrate by vapor phase aluminiding the substrate to form a first region of aluminide coating;

then placing the coated PtAl-coated substrate into a pack powder bed having a composition of, in weight percent, about 0.25% Hf, about 1% aluminum-containing powder, about 0.2% halide activator and optionally about 0.25% Si at a temperature in the range of about 1850° F.–2000° F. for about 2–6 hours to allow for formation over the first region of a second region of aluminide coating so that Hf, and optionally Si, diffuse from the second region into the first region.

* * * * *